United States Patent [19]

Wager et al.

[11] 4,447,053
[45] May 8, 1984

[54] DEVICE FOR SEPARATING INDIVIDUAL SHEETS COMBINED INTO A STACK

[75] Inventors: Mats Wager, Sollentuna; Jakub Hirschberg, Täby, both of Sweden

[73] Assignee: Siemens Aktiengesellschaft, Berlin & Munich, Fed. Rep. of Germany

[21] Appl. No.: 345,242

[22] Filed: Feb. 3, 1982

[30] Foreign Application Priority Data

Feb. 10, 1981 [DE] Fed. Rep. of Germany ....... 3104670

[51] Int. Cl.³ .............................................. B65H 3/32
[52] U.S. Cl. ..................................... 271/113; 271/147
[58] Field of Search ............... 271/109, 113, 126, 147, 271/161, 169, 179, 192, 163

[56] References Cited

U.S. PATENT DOCUMENTS

| 440,401 | 11/1890 | Ethridge | 271/113 X |
| 934,126 | 9/1909 | Abrahams | 271/113 |
| 3,616,736 | 11/1971 | Bergstrom | 271/161 X |
| 3,682,473 | 8/1972 | Kuyt | 271/179 X |
| 4,252,308 | 2/1981 | Templeton | 271/179 |
| 4,355,798 | 10/1982 | Villa | 271/109 X |

FOREIGN PATENT DOCUMENTS 54-104168  8/1979  Japan .................................. 271/113

Primary Examiner—Richard A. Schacher
Attorney, Agent, or Firm—Hill, Van Santen, Steadman & Simpson

[57] ABSTRACT

A device for separating film sheets in a stack, particularly useful in X-ray installations, includes a threaded rotary screw member disposed within a magazine containing the stack of sheets for raising and lowering the sheet stack within the magazine and individually handling the uppermost sheet in the stack for transport to or from the magazine.

16 Claims, 4 Drawing Figures

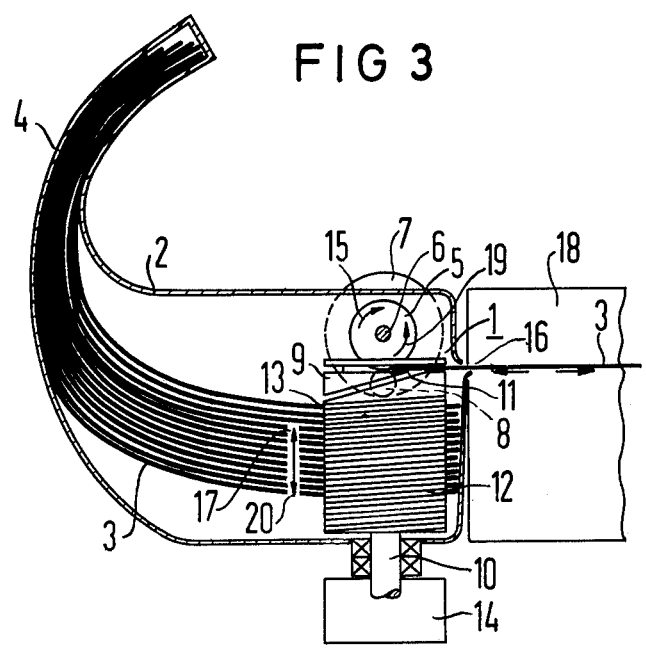
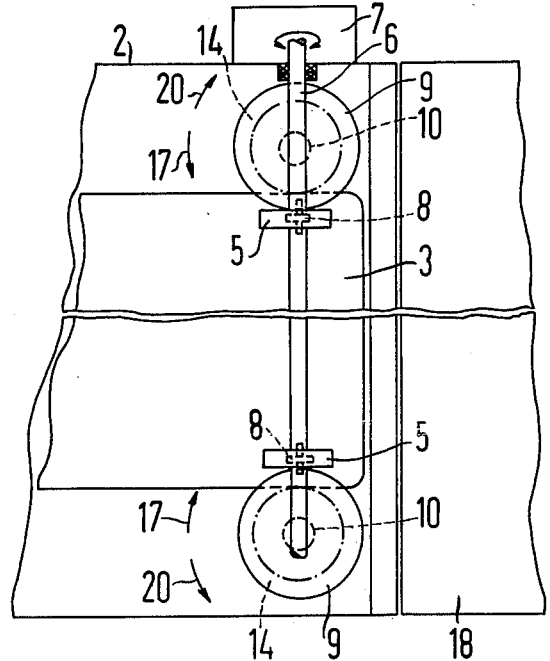

DEVICE FOR SEPARATING INDIVIDUAL SHEETS COMBINED INTO A STACK

RELATED APPLICATION

The present application relates to a commonly assigned application Ser. No. 345,241, entitled "Transport Device for Individual Sheets to be Combined Into a Stack" and filed of even date herewith.

BACKGROUND OF THE INVENTION

The invention relates to a device for separating individual sheets combined into a stack, particularly, sheets of film used in X-ray equipment.

A known problem in existing film changers, particularly in connection with X-ray installations, is the separation of individual sheets of flat film stacked in a feeder magazine in such a manner that only one sheet is transported to the exposure station of the film changer. Delivery of a plurality of sheets simultaneously would make an exposure impossible.

A presently known type of film changer calls for the film sheets in the feeder magazine to be individually disposed between disks. In this type of film changer, the sheets of film must be perforated in the two front edge corners disposed in the direction of transport, so that the sheets can be seized by pins of two conveyor belts guided along the feeder magazine for transport into the exposure station of the film changer. Accordingly, a significant disadvantage in this type of film changer is that only appropriately perforated film sheets can be used.

A further type of known film changer is disclosed in U.S. Pat. No. 3,616,736, which corresponds to German GLP 1,942,988. In this type of film changer, individual sheets of film are retained between disks, partially by means of spring pressure. A feed arm is provided with a claw means which respectively seizes the uppermost film sheet of the stack at its back edge for removing the sheet of film in the transport direction from the feeder magazine to the exposure station. The feeder magazine of this film changer must be manually loaded with sheets of film in a dark room. A further significant disadvantage of this type of feeder mechanism is that the transport path for film through the film changer must be disposed in a horizontal plane, which increases the overall space taken up by the film changer. Any sort of oblique positioning of the film changer with respect to the feeder magazine renders the transport of film sheets from the feeder magazine impossible.

The present invention concerns a novel construction for film sheet magazines which is both compact and in which the sheets of film are separated from one another in such a manner that a reliable and faultless delivery of consecutive single sheets of film from the magazine is guaranteed. The inventive magazine construction lends itself to either mechanical or automatic loading.

SUMMARY OF THE INVENTION

A film sheet magazine in which individual film sheets of a stack are received or transmitted in a film changer installation includes at least one rotary screw device for guiding the sheets one at a time into or out of the magazine. The thread pitch of the screw member (the thread pitch referring to the spacing of adjacent grooves of the screw threads) is greater than the thickness of a respective sheet in the stack. An individual sheet is raised upwardly from the magazine stack by means of transmission along the movement of the screw threads during feeding of the individual film sheets to the exposure station. By reversing the rotational direction of the screw member, mechanical or automatic loading of the feeder magazine may be undertaken.

The film magazine, in accordance with the present invention, is constructed with an inside curvature such that the sheets guided in the screw member follow the curvature of the housing. The uppermost sheet of the stack is disposed closest to a sheet transport mechanism disposed adjacent in upper end of the housing. Orientation of the magazine housing is independent of the spacial position of the film changer. The sheets of film guided from the magazine by the screw member are conducted upwardly to a position at which a suitable transport means can convey them further.

BRIEF DESCRIPTION OF THE DRAWING

FIG. 3 is a cross-sectional side view of a third embodiment of a sheet film magazine having an individual film sheet separating device constructed in accordance with the present invention.

FIG. 4 is a broken-away plan view of the sheet film magazine of FIG. 3.

DESCRIPTION OF THE PREFERRED EMBODIMENTS

Figure 1:
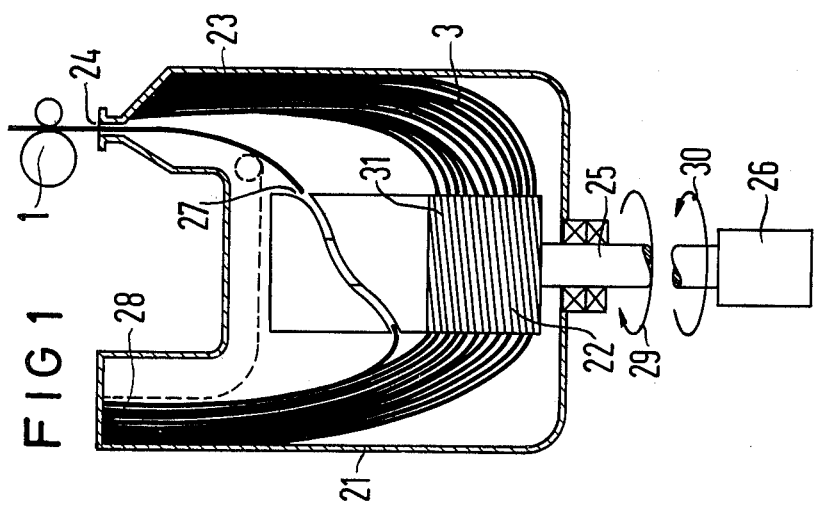
FIG. 1 is a cross-sectional side view of a sheet film magazine for a film changer having an individual sheet separating device constructed in accordance with the present invention.

FIG. 1 illustrates a feeder magazine housing 21 for a film changer installation constructed with a U-shaped cross-section. A single rotary screw member 22 is disposed substantially centrally of the U-shaped cross-section extending upwardly from the bottom wall of the housing 21. A feed opening 24 is provided at the upper end of one leg 23 of the U-shaped housing for the passage of individual flat film sheets 3 which are used in the film changer installation. The screw 22 is driven via a rotary shaft 25 connected to a rotary motor 26 disposed exterior of the housing 21.

The feeder magazine 21 may be loaded with the film sheets 3 for arrangement in a curved stack within the magazine by suitable guide means not shown. The sheets of film are consecutively conducted through the opening 24 and passed downwardly into the magazine housing along an annular sloping groove 27 formed in the upper end of the screw member 22 until the sheet abuts against the closed end wall 28 of the opposed leg of the U-shaped housing. Subsequently, the screw 22 is rotated in the direction of the arrow 30 in order to lower individual film sheets in succession by means of screw threads 31 into a stack curved in a U-shaped configuration to follow the curvature of the housing 21.

In order to transport an individual sheet of film out of the magazine 21, the screw 22 is rotated in the direction of the arrow 29 causing the film sheets in the stack to be passed upward in the housing from thread to thread. The uppermost film sheet is eventually disposed such that one lead end projects out of the opening 24 of the housing, where that end of the sheet is seized by a suitable transport device, such as drive roller means 1 for passage of the sheet to the exposure station. The uppermost sheet is lifted from the top of the stack at an accelerated rate relative to the remainder of the stack for passage through the housing opening 24 by being conducted along the sloping or thread-like course of the groove 27.

The thread-like course of the groove 27 preferably exhibits a greater pitch than the screw threads 31 located at the lower end of the screw 22, such that each sheet of film 3 passed into the groove 27 is quickly brought into a discharge position for engagement with the transport means 1 with one rotation of the screw 22.

Figure 2:
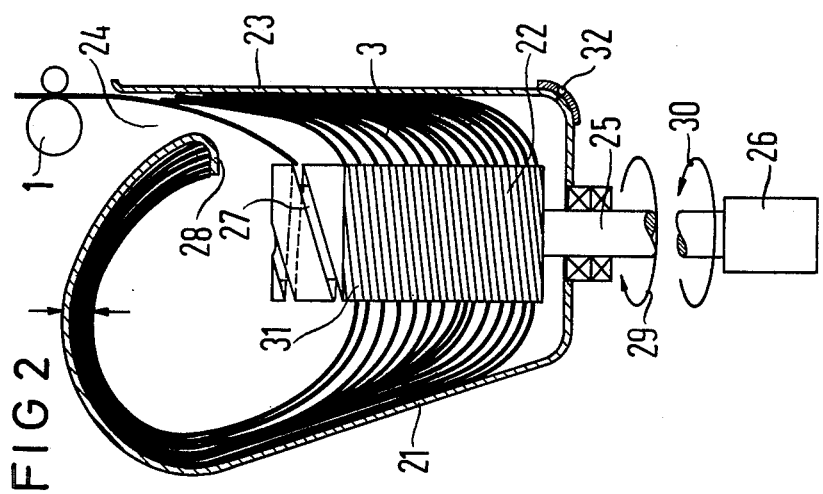
FIG. 2 is a cross-sectional side view of a further embodiment of a sheet film magazine having an individual film sheet separating device constructed in accordance with the present invention.

FIG. 2 illustrates a further embodiment construction of the film sheet magazine 21 in which the magazine housing is arranged with one upright leg portion curved over the top of the housing and the opposed upright leg member 23 disposed substantially vertically upright. The leg 23 may be flipped down by means of hinges 32 during the loading of the film sheets in a stack within the housing. When the housing leg 23 is lowered, the sheets of film 3 can be easily introduced in succession into the groove 27 and subsequently screwed down into a curved stack arrangement via passage along the screw threads 31. The FIG. 2 embodiment permits a more horizontal access to the interior of the housing 21 during film loading, such that the pitch selected for the groove 27 may be less steep than that used for the FIG. 1 embodiment.

With respect to FIG. 2, individual film sheets are respectively transported out of the housing for pickup by the transport means 1 when the screw 22 is rotated in the direction 29. This delivery of consecutive uppermost sheets of the stack is carried out in the manner as described above in connection with FIG. 1.

FIGS. 3 and 4 illustrate the third embodiment of the present invention in which a sheet film magazine 2 is constructed of a housing having a substantially horizontally directed end and an opposed upwardly curved side 4. A film transport means 1 is disposed overlying the stack of individual film sheets 3 contained in the housing 2 adjacent the horizontally directed end of the housing.

The transport means 1 includes spaced-apart conveying rollers 5 formed on an axle 6 which is rotated by means of a suitable reversible rotary motor 7. The transport means 1 further includes a pair of running rollers 8 respectively secured to two rotary members 9 positioned laterally outward of the conveying rollers 5. The rotary members 9 turn on axles 10 having vertical axes which intersect with the laterally disposed axle 6.

Each rotary member 9 is formed with a downwardly sloping or thread-like lateral groove 11 for the transport of individual film sheets 3 upwardly for engagement with the drive rollers 5 as further described below. At that side of the rotary member 9 substantially opposed from the running roller 8, the groove 11 connects to annular screw threads 13 formed on a screw member forming the lower portion of the rotary part 9. The uppermost of the threads 13 lies immediately adjacent the lower edge portion of the diameter of the running roller 8. The screw 12 serves to individually separate the film sheets 3 in a stack and the threads 13 of the screw 12 are connected substantially without interruption to the groove 11. The thread pitch of the screw 12 corresponds to two-ten times the thickness of an individual film sheet 3. In accordance with the preferred embodiment, the rotary part 9 is a one-piece member containing the groove 11 and the screw portion 12. The rotary part 9 is connected for rotation about its vertical axis via a shaft 10 driven by a suitable reversible rotary motor 14.

The laterally spaced apart portions of the transport means 1 serves to act upon opposed sides of each film sheet 3 during transport of the sheet to and from the magazine 2 and are synchronously operated. As shown in FIGS. 3 and 4, the magazine 2 is loaded with a stack of film sheets 3 and arranged for feeding to a film changer 18. For loading the film sheets into the magazine 2, the magazine may be connected to a suitable loading device not illustrated. During loading of the magazine 2, the conveying rollers 5 are turned in the direction of arrow 14 at a suitable constant speed. The sheet of film 3 is then inserted into a slot-like opening 16 laterally formed along the horizontally disposed end of the magazine housing, such that the laterally opposed sides of the film sheet are guided in the corresponding grooves 11 for contact with the lower circumferential portions of the conveying rollers 5. The rotary motors 14 are switched on so that the rotary members 9 turn about shafts 10 until the running rollers 8 are placed substantially beneath the conveying rollers 5. In this manner, the film sheet is pressed against the conveying rollers 5 by means of the running rollers 8. The motors 14 are then switched off, such that the running rollers 8 retain this position, and the film sheet is conveyed fully into the magazine housing until the tail end of the sheet reaches the position within the housing as shown in FIG. 4. The motors are again turned on such that the rotary members 9 along with the screws 12 are now turned in the direction of the arrows 20 and the sheet of film loaded into the housing is conducted by the grooves 11 to the beginning of the threads 13 of the screws.

A successive film sheet is then inserted into the slot 16 in the manner of the first sheet and the running rollers are again positioned substantially beneath the conveying rollers 5 to permit loading of the successive sheets into the housing. Due to the rotary motion of the rotary members 9, the first sheet of film is transported downwardly within the housing along the threads 13 of the screws 12. The speed of the rotary members 9 and of the screws 12 connected thereto can thus be controlled as a function of the desired transport frequency of the sheets of film 3. The process described above is repeated until the magazine 2 is filled with a completed stack.

After the magazine has been loaded, it is re-connected to the film changer 18. In order to conduct individual sheets of film out of the magazine housing, the loading operation is carried out in reverse sequence. The conveying rollers 5 are turned in the direction of the arrow 19 at a suitable constant speed. The rotary members 9 along with the screws 12 are turned in the direction of arrows 17, so that the uppermost sheet of the stack is conveyed up to the conveying rollers 5 by means of the grooves 11. The underlying sheets of the stack are simultaneously passed upward along the screw threads 13. When the running rollers 8 are substantially beneath the conveying rollers 5, the uppermost film sheet is pressed against the conveying rollers 5 and this sheet is conveyed out of the magazine 2 through the lateral slot 16 into the film changer 18 for exposure. During a further rotation of the rotary members 9, the next film sheet is conveyed to the conveying rollers 5 and delivered to the film changer in the manner described above.

After exposure in the exposure station, each film sheet is transported to a collector magazine connected to the film changer. The transfer of sheets of film 3 into the collector magazine may correspond to the operation described above in connection with the loading of the magazine 2. The collector magazine having a stack of exposed film sheets may be connected to a developing device and the sheets of film of the stack may be successively transported out of the collector magazine in accordance with the manner described above in connection with the discharge of sheets from the magazine housing 2.

The present invention thus provides a compact magazine construction for storing stacks of flat film sheets, wherein feeding and delivery of individual sheets in succession to and from the magazine one at a time is assured with suitable separation of the individual film sheets in the stack and without the sheets being damaged.

Although various minor modifications may be suggested by those versed in the art, it should be understood that we wish to embody within the scope of the patent warranted herein all such modifications as reasonably and properly come within the scope of our contribution to the art.

We claim as our invention:

1. Apparatus for separating individual film sheets in an X-ray installation film changer, said sheets being arranged in a vertical stack laterally disposed one on top of the other in a housing comprising a screw member mounted in said housing for rotation about a vertical axis, said screw member formed with a continuous screw thread having a pitch greater than the thickness of each sheet, and every said sheet always being individually respectively engaged in said screw thread vertically spaced apart from the next adjacent sheet such that rotation of said screw member vertically displaces said sheets simultaneously in said housing and said sheets can not stick together.

2. The apparatus of claim 1, further comprising a rotary member having a thread-like lateral groove overlying said screw member and mounted for rotation with said screw member, said groove having a pitch substantially greater than the pitch of said screw thread and leading to the uppermost screw thread for receiving an uppermost sheet to said stack and displacing said uppermost sheet at an accelerated rate relative to the remainder of said stack.

3. The apparatus of claim 2, wherein said screw member and rotary member are integral.

4. The apparatus of claim 2, wherein said housing is formed with a discharge opening for receiving individual sheets therethrough at one end of said housing, one end of said uppermost sheet being directed to or from said discharge opening by said groove depending on the direction of rotation of said screw member.

5. The apparatus of claim 1, wherein two said screw members are positioned adjacent opposed lateral sides of said stack in said housing and synchronously operated.

6. The apparatus of claim 1, wherein said housing is of curved cross-section such that said stack is bent in said housing.

7. The apparatus of claim 6, wherein said housing is of substantially U-shape cross-section with said screw member disposed substantially intermediately of said U-shape cross-section, a leg of said housing having an upper end opening for receiving individual sheets therethrough, and one end of said uppermost sheet being directed to or from said opening by said groove depending on the direction of rotation of said screw member.

8. The apparatus of claim 1, wherein the pitch of said thread is two times the thickness of each sheet.

9. Apparatus for separating individual film sheets from a vertical stack contained in a feeder housing for a film changer system comprising an opening formed at an upper end of said housing, a screw means mounted in said housing for rotation about a vertical axis, said screw means having continuous threads of a pitch greater than the thickness of each sheet and each said sheet always being respectively individually engaged in said screw threads vertically spaced apart from the next adjacent sheet such that said sheets can not stick together, and said screw means having a thread-like lateral groove overlying said threads and leading to said threads at a pitch substantially greater than the pitch of said threads, such that rotation of said screw means causes said stack to be raised upwardly in said housing with said sheets individually passing from thread to thread and an uppermost sheet of said stack to be received and raised at a relatively faster rate from the top of said stack by said groove for passage through said opening.

10. The apparatus of claim 9, wherein said housing is of curved cross-section such that said stack is bent in said housing.

11. The apparatus of claim 10, wherein said housing is of substantially U-shaped cross-section with said screw means disposed substantially intermediately of said U-shape cross-section and said opening being formed in an upper end of one leg of said housing.

12. The apparatus of claim 10, wherein said housing is of substantially U-shape cross-section with said screw means disposed substantially intermediately of said U-shaped cross-section, one leg of said housing curving back over said screw means for supporting therein end portions of said sheets and the other leg of said housing including an upright wall mounted for movement about a laterally directed pivot axis for loading access to said housing.

13. Apparatus for receiving individual film sheets to form a vertical stack in a collector housing for a film changer system comprising an opening formed at an upper end of said housing for successive passage of individual sheets therethrough into said housing, a screw means mounted in said housing for rotation about a vertical axis, said screw means having an upper end thread-like groove for individually engaging side edges of respective said sheets passed into said housing and guiding said sheets downwardly and said screw means having continuous threads leading downwardly from said groove of a pitch substantially less than that of said groove for individually engaging side edges of respective said sheets received from said groove and passing said sheets downwardly therealong upon rotation of said screw means for forming a vertical stack of sheets wherein each said sheet is always vertically spaced apart from the next adjacent sheet and wherein said sheets can not stick together.

14. The apparatus of claim 13, wherein said housing is of curved cross-section such that said stack is bent in said housing.

15. The apparatus of claim 14, wherein said housing is of substantially U-shape cross-section with said screw means disposed substantially intermediately of said U-shape cross-section and said opening being formed in an upper end of one leg of said housing.

16. The apparatus of claim 14, wherein said housing is of substantially U-shape cross-section with said screw means disposed substantially intermediately of said U-shape cross-section, one leg of said housing curving back over said screw means for supporting therein end portions of said sheets and the other leg of said housing including an upright wall mounted for movement about a laterally directed pivot axis for loading access to said housing.

* * * * *